Figure 1:
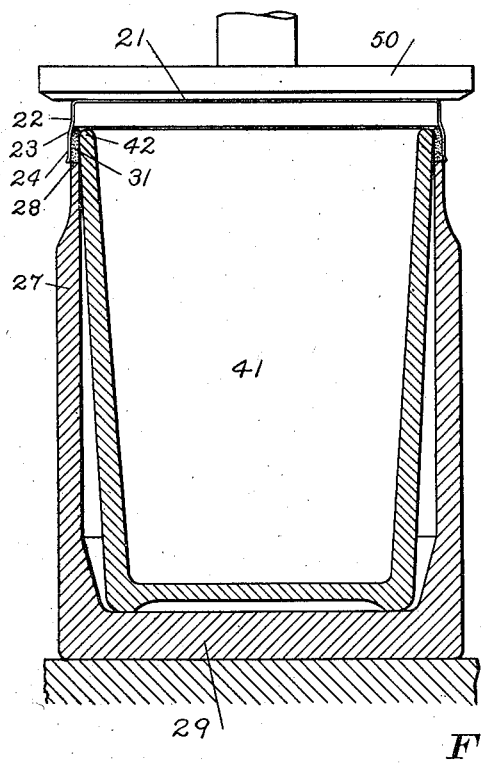

B. ARKELL.
HERMETIC SEALING APPARATUS.
APPLICATION FILED OCT. 3, 1905.

1,002,192.

Patented Aug. 29, 1911.

2 SHEETS—SHEET 1.

Witnesses:

Inventor
Bartlett Arkell
By

B. ARKELL.
HERMETIC SEALING APPARATUS.
APPLICATION FILED OCT. 3, 1905.

1,002,192.

Patented Aug. 29, 1911.

2 SHEETS—SHEET 2.

Witnesses:

Inventor
Bartlett Arkell

UNITED STATES PATENT OFFICE.

BARTLETT ARKELL, OF CANAJOHARIE, NEW YORK, ASSIGNOR OF ONE-FOURTH TO WILLIAM A. LORENZ AND ONE-FOURTH TO WILLIAM H. HONISS, OF HARTFORD, CONNECTICUT, AND ONE-HALF TO BEECH-NUT PACKING COMPANY, OF CANAJOHARIE, NEW YORK, A CORPORATION OF NEW YORK.

HERMETIC-SEALING APPARATUS.

1,002,192.      Specification of Letters Patent.     Patented Aug. 29, 1911.

Application filed October 3, 1905. Serial No. 281,113.

*To all whom it may concern:*

Be it known that I, BARTLETT ARKELL, a citizen of the United States, and resident of Canajoharie, in the county of Montgomery and State of New York, have invented certain new and useful Improvements in Hermetic-Sealing Apparatus, of which the following is a full, clear, and exact specification.

This invention relates to an improved method of seating and sealing the hermetic closures of tumblers and other plain rimmed or shoulderless receptacles, and to apparatus for employing the said method.

The present closure joint now commonly used for the hermetic sealing of jars and other receptacles is what is commonly known as the wedging closure, in which the sealing gasket of rubber or similar material is compressed downwardly and sidewise against the inner or outer edge of the rim of the receptacle, by means of a cap having a conical or flaring flange. The natural tendency of the downward component of pressure is to slide the gasket downwardly from its proper sealing relation to the closure joint. In order to locate and maintain the gasket in uniform relation to its sealing seat, prior to and during the sealing operation, jars which are intended to be hermetically sealed are commonly provided with an annular shoulder, upon which the gasket rests, these shoulders serving to facilitate the correct placing of the gasket as well as to maintain them in correct position during the sealing operation. These shoulders, however, unfit the jars for many subsequent household uses which might be served by a plain rimmed receptacle, such as a tumbler, after it has been emptied of its original contents. The difficulty of employing the preferred wedging type of closure upon tumblers and similar plain rimmed or shoulderless receptacles has been that the latter afford no means for receiving and maintaining the closure in correct position upon the rim of the receptacle prior to and during the sealing operation. In the present invention this difficulty is overcome by providing a gasket support which is extraneous to the tumbler or other receptacle to be sealed. This support preferably extends entirely around the tumbler and supports the gasket at a height which is in suitable relation to the rim, or to that zone of the receptacle upon which the seal is to be made. Thus a single extraneous support of this character serves for a great number of tumblers in succession, thereby dispensing with the necessity for an individual shoulder for each receptacle, as in the case of the well-known shouldered jars. This support establishes a level or parallel relation of the cap and gasket with that portion of the tumbler rim on which the gasket is seated in the sealing of the closure, and while preventing the gasket from being carried downwardly from its proper sealing zone, permits it to be forced by the flaring cap sidewise against that zone, thus enabling the wedging type of closure to be made upon a tumbler or other plain rimmed receptacles as reliably as that closure could be made upon the ordinary type of jars having individual shoulders for positioning and supporting the gasket.

This invention may be adapted to the sealing of many kinds of receptacles. It is here shown as applied to the sealing of an ordinary tumbler, as a good example of a receptacle well adapted to a variety of household uses after its original purpose as a sealed package has been served.

Figure 2:
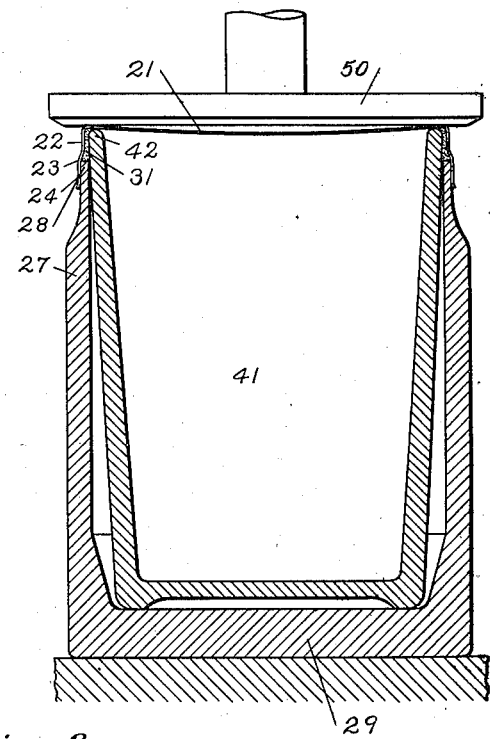
Figure 3:
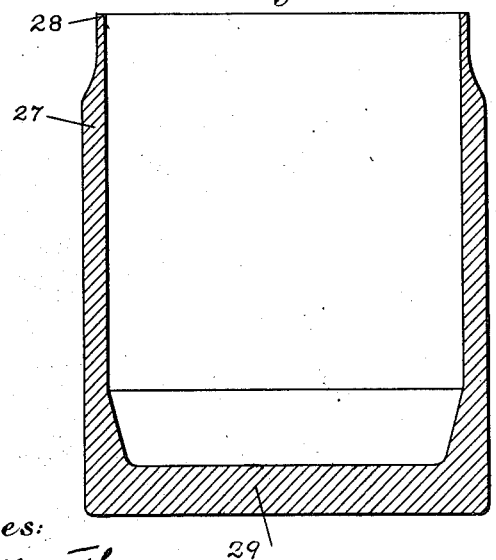
Figure 4:
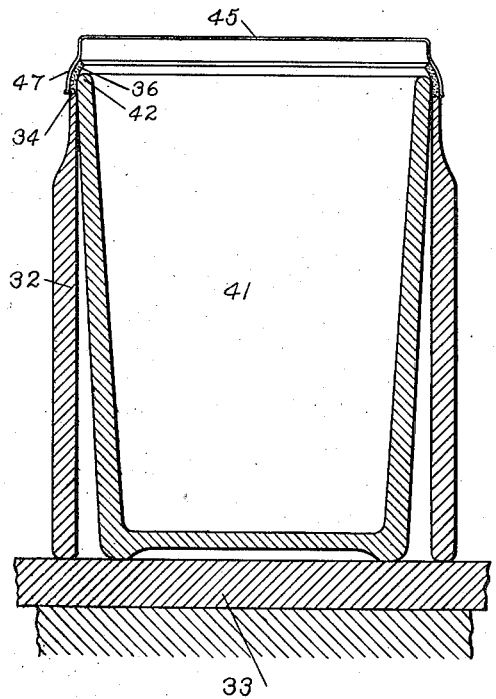
Figure 5:
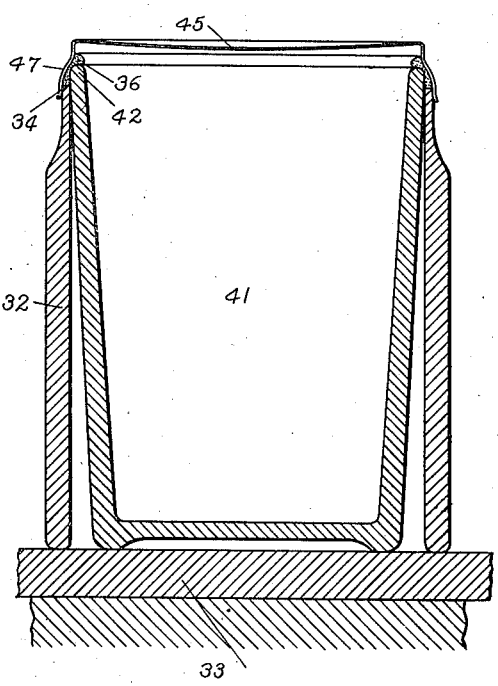
Figure 6:
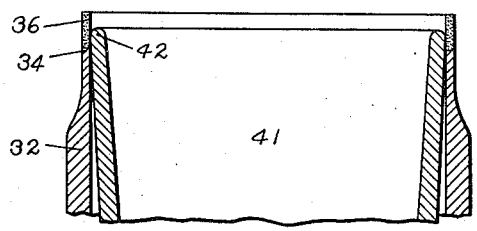

Figures 1 and 2 of the drawings are side views in section of a tumbler with its exterior support, gasket and cap, Fig. 1 showing the parts in the position occupied by them during the air expelling or exhausting operation; while Fig. 2 shows the cap pushed down to its sealed position. Fig. 3 is a side view in section of one embodiment of the exterior gasket support. Figs. 4 and 5 are side views in section of a tumbler with a modified gasket support, and a modified form of cap, Fig. 4 showing the parts in their exhausting position, and Fig. 5 showing them in their sealed position. Fig. 6 is a fragmentary side view in section of the top of a tumbler with the exterior support and gasket, showing the latter in position before the cap has been placed thereon.

The extraneous gasket support may obviously be made in a diversity of forms, according to the size and shape of the tumblers to be sealed, or according to the character of the apparatus to be used for the sealing operation, or according to the sterilizing or other processes to which the contents of the tumblers are to be subjected. In Figs. 1, 2 and 3, the support 27 is of a cup shaped form, approximating that of the tumblers to be sealed; and having a bottom 29 upon which the tumbler 41 rests, with its rim 42 extending above the top surface 28 of the support a distance suitable for the width of the gasket to be employed, allowing for the position of the zone of the receptacle at which the sealing pressure is to be applied. The top surface 28 of the support is made thin enough to clear the inside surface of the cap rim, forming a ledge or shoulder which for all practical purposes is the equivalent of the shoulders now commonly made upon all jars employed for hermetic sealing, particularly those adapted for receiving the wedging type of closure. In the wedging type of closure as herein shown, the cap 21 is made with a flaring portion 23 which turns the upper portion of the gasket inwardly against and slightly over the outer edge of the tumbler rim. The gasket 31 may be of any suitable form, the form herein shown being rectangular or band shaped. In employing this improved gasket support the filled tumbler 41 is placed in the support 27 and the gasket 31 is stretched around the rim of the tumbler with its lower edge resting on the ledge 28 of the support. The cap 21 is then placed on the gasket so that the flaring portion 23 rests against the upper portion of the gasket 31 and is thereby sustained and centralized in proper sealing relation to the tumbler and the gasket, these parts being now in the position shown in Fig. 1. The tumbler thus prepared may be sealed by well-known methods of hot or dry processing, according to the character of its contents. When sealed by dry processing, the tumbler and support while in the condition shown in Fig. 1, are placed in a suitable exhausting chamber and subjected to the air exhausting operation, at the conclusion of which the cap is forced down by means of a presser 50 operated by the external air pressure or by mechanical means in any of several well-known ways. The presser carries the cap down to the sealed position shown in Fig. 2, the result of the pressure of the flaring portion 23 and the straight portion 22 of the cap pinching the gasket against the side of the tumbler, the support 27 sustaining the gasket against the downward pressure so that the upper part is wedged inwardly over the rounded tumbler rim 42. The tumbler being thus effectually sealed, the external atmosphere pressure is then allowed to enter the sealing chamber, and holds the cap in the sealed position of Fig. 2, whereupon the plunger 50 may be released and the tumbler removed from the chamber.

In the modification shown in Figs. 4, 5 and 6, the gasket support 32 is made substantially in the form of a cylinder open at both ends, the bottom end of the cylinder resting upon a tray or plate 33 upon which the tumbler 41 also rests, thus preserving the proper height relation between them. This form of support may be applied to or removed from the tumbler either from above or below; and may be found more convenient for use in connection with some processes or apparatus. The upper or ledge portion 34 of the support is herein shown to be similar to that shown in Figs. 1, 2 and 3.

In the modification shown in Figs. 4 and 5, the flaring portion 47 of the cap 45 flares at a greater angle than the flange of the cap 21, shown in the previous figures. Hence the zone of sealing contact will be somewhat higher than in the arrangement shown in Figs. 1 and 2.

The method of employing the form of support shown in Figs. 4, 5 and 6 may be similar to that shown in the previous figures, with the additional capacity, which may be useful in many instances, that the support may be slipped down from the top over the filled tumblers.

That portion of the gasket support which is below its supporting ledge 28 or 34 may be of any desired or convenient shape. It need not be made with continuous walls as herein indicated, but those walls may be more or less open; or the lower portion may be in the form of supporting legs or posts, the essential feature being that it affords a supporting ledge for placing and maintaining the gasket in proper relation to the desired sealing zone of the receptacle.

I claim as my invention:—

1. In sealing apparatus, the combination, with means for pressing down a sealing cap upon its gasket, of an annular gasket support extraneous to the receptacle to be sealed, for sustaining the gasket in suitable relation to the sealing joint, and for supporting the gasket at the desired height against the downward pressure of the sealing operation.

2. Sealing apparatus for tumblers and other plain rimmed receptacles, including in combination means for pressing down a cap upon its sealing gasket, and means extraneous to and extending around the tumbler for temporarily supporting the sealing gasket against the downward pressure of the sealing operation.

3. Sealing apparatus for tumblers and other shoulderless receptacles, including in combination means for pressing down a sealing cap upon its gasket, and a gasket support extraneous to and surrounding the tumbler, and forming a temporary shoulder within the cap rim for sustaining the gasket against downward displacement during the sealing operation.

In witness whereof I have signed my name to this specification, in the presence of two subscribing witnesses.

BARTLETT ARKELL.

Witnesses:
JOHN F. KAVANAGH,
WALTER SIMMONS.